April 16, 1963

J. W. MONROE ET AL 3,085,422

HYDRO-DYNAMIC LOADER

Filed Aug. 13, 1959

INVENTORS
C. M. NEAL
J. W. MONROE
BY
Curtis, Morris & Safford
ATTORNEYS

April 16, 1963 J. W. MONROE ET AL 3,085,422
HYDRO-DYNAMIC LOADER

Filed Aug. 13, 1959 3 Sheets-Sheet 2

INVENTORS
C. M. NEAL
J. W. MONROE
BY
*Curtis, Morris & Safford*
ATTORNEYS

April 16, 1963  J. W. MONROE ET AL  3,085,422
HYDRO-DYNAMIC LOADER

Filed Aug. 13, 1959  3 Sheets-Sheet 3

INVENTORS
C. M. NEAL
J. W. MONROE
BY
Curtis, Morris & Safford
ATTORNEYS

United States Patent Office 3,085,422
Patented Apr. 16, 1963

3,085,422
HYDRO-DYNAMIC LOADER
Joseph W. Monroe and Charles M. Neal, Huntsville, Ala., assignors to Thiokol Chemical Corp., Trenton, N.J., a corporation of Delaware
Filed Aug. 13, 1959, Ser. No. 833,505
12 Claims. (Cl. 73—12)

This invention relates to apparatus for testing pressure vessels, and in particular to an apparatus for simulating sudden dynamic pressure loads to which the pressure vessel is subjected in use.

In the design of a high-pressure vessel it is important to be able to study the behavior of materials of construction to be used therein prior to actual use of the vessel for its intended purpose. Stress distribution can be calculated in most cases when the geometry of the vessel is known and when the properties of the material of construction are also known. In some cases, however, as when a small safety factor is employed, it is not always entirely possible to predict by mathematical calculation the degree of stress which might be present under certain types of internal loading. A typical example of this would be in the case of a solid propellant rocket motor.

Such rocket motors usually comprise a thin-walled metal motor casing containing an appropriate solid propellant material which is cast or inserted therein. Upon ignition of this propellant, the gaseous products of combustion provided thrust and consequent motive force to the rocket and the vessel containing the propellant is subjected to high, brief and nearly instantaneous loading stresses. These loading stresses are "dynamic" in nature, as distinguished from the subsequent "static" loading which occurs after the motor has reached its design operating pressure and which continues until burn-out.

The design of such pressure vessels as exemplified above often allows only a small margin of safety, particularly in the case of a self-propelled air-borne vehicle or missile system, as weight considerations are paramount. It is therefore highly desirable to know in advance whether or not a particular vessel design can withstand the above mentioned dynamic loads, and how close to rupture it is possible to construct such a vessel without rupture actually occurring. In the special case of rocket motors it is obvious how detrimental would be the effects of an unexpected rupture of the vessel wall, due to too sudden or too high a dynamic load, not only in view of the impairment of ballistic performance in the case of an overall missile system, but especially with respect to human safety during the critical stages of arming and firing the missile.

A major problem in non-destructive testing of pressure vessels is that of duplicating the sudden increase in pressure in a short period of time, or in other words, the pressure-time curve encountered by component parts of the vessel during actual operation. The static or constant load is relatively easy to duplicate. Furthermore, in cases where the maximum static load is less than the maximum dynamic load the former is least severe in terms of overall stress on the vessel. Consequently the major problem areas in duplicating operational pressure-time curves relate to the non-static or dynamic loads.

Dynamic loading is often characterized by sudden and transient increases in pressure, and may or may not be repeated at intervals throughout the operational use of the vessel. These loads can increase from minimum to maximum in very short periods of time, and fall off just as rapidly. In certain types of ordnance apparatus, as for example in rocket motors, severe dynamic loading occurs upon ignition of the motor. The main problem in non-destructive testing of such rocket motor casings is to accurately duplicate the effect that ignition has upon the components of the motor case. Moreover, sudden dynamic loading may be repetitive, so that what is also desired, in any testing apparatus aimed at duplicating this variety of loading, is the ability of the apparatus to similarly act in a repetitive fashion, thus duplicating as closely as possible the actual behavior of the vessel being tested.

Efforts to construct such an apparatus capable of effecting sudden increases in pressure in a short period of time or, short pressure rise-time, and high loading pressures have been partially successful in the past, but have not been able to effect the very short rise-times that are needed in this type of dynamic testing, particularly when the pressure vessel being tested has a very large volume and consequently large volumetric displacement.

It is a primary object of this invention, therefore, to provide an apparatus for subjecting a pressure vessel to a dynamic pressure load which simulates the loading encountered in use.

Another object is to provide an apparatus which will produce a dynamic load throughout the interior of a pressure vessel in a very short time interval in the order of milliseconds.

Another object is to provide a testing apparatus of the type indicated in which the pressure rise-time may be controlled to simulate the dynamic loading of any particular vessel.

Still another object of the present invention is to provide a testing apparatus of the type indicated which is of relatively simple and compact construction, adapted for economical manufacture and one which is safe and reliable in operation.

Further objects of this invention will be apparent from the following description and drawings and from the operation of the apparatus itself as hereinafter described. It is not intended that the invention be limited to the above mentioned objects or to its preferred embodiments as shown in the drawings, but extends to all features of novelty evident to one skilled in the art and as defined by the claims.

Figure 1:
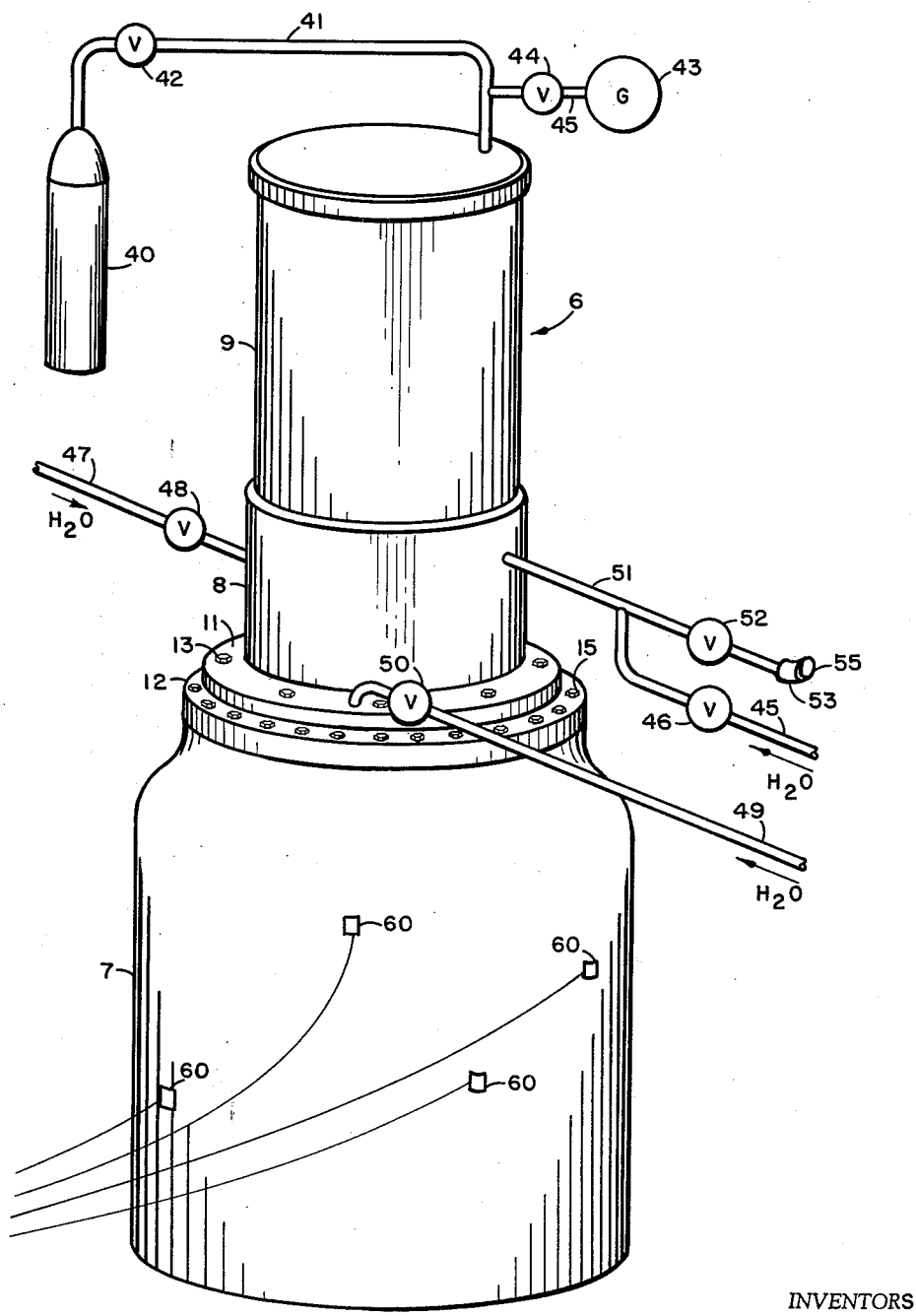
FIGURE 1 is a perspective view of a dynamic loader incorporating the present invention and shown mounted on a pressure vessel to be tested.
Figure 2:
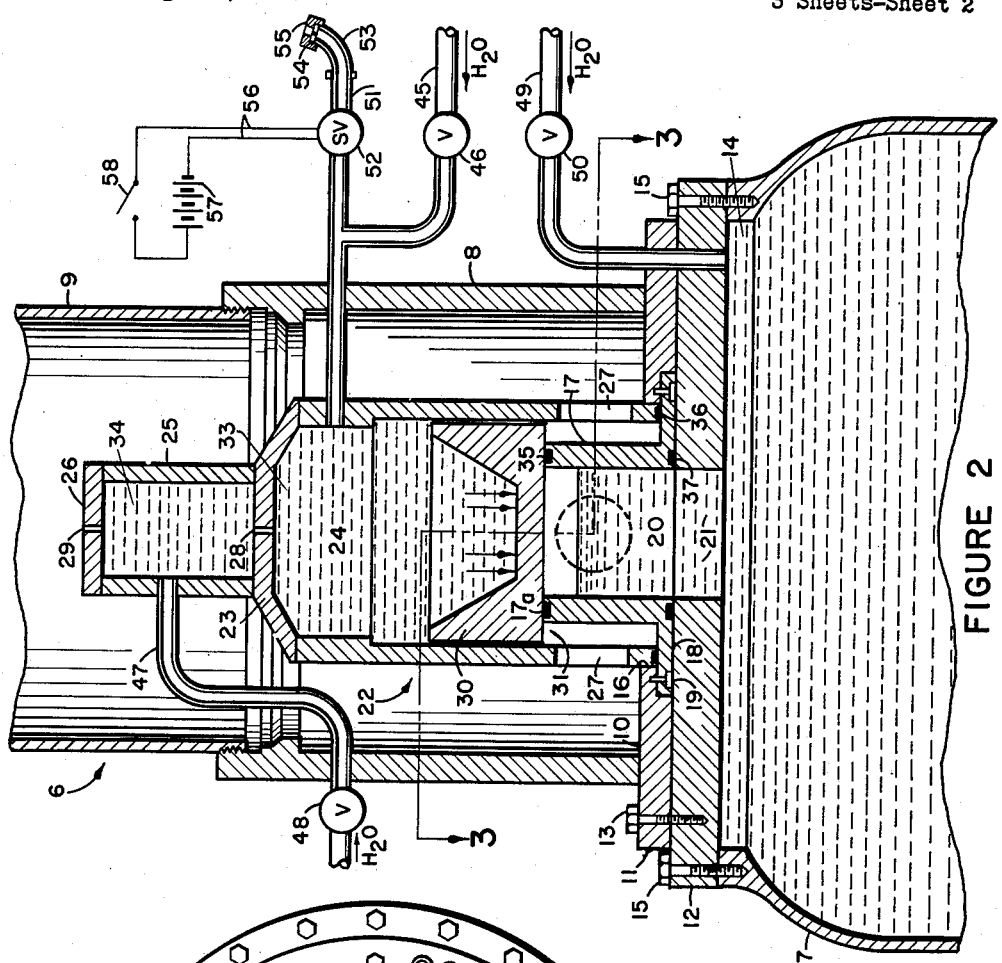
FIGURE 2 is an enlarged sectional view of the dynamic loader in side elevation and showing the relationship of the elements prior to a testing operation.
Figure 3:
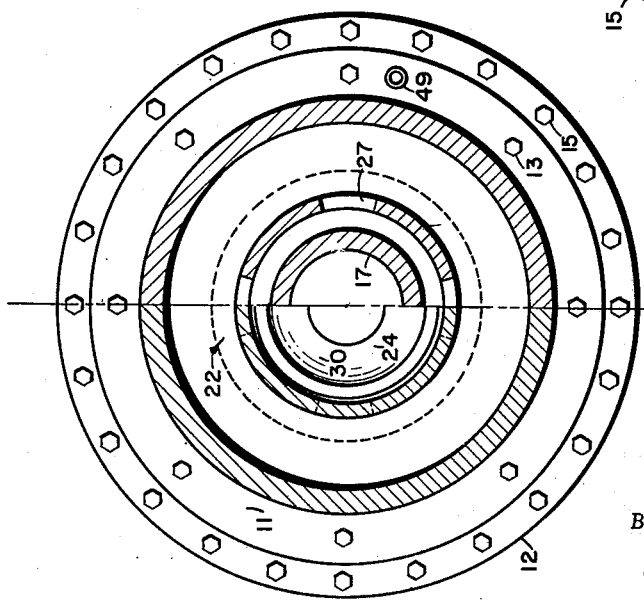
FIGURE 3 is a transverse section taken on line 3—3 of FIGURE 2 to show the relationship of the parts.

A testing apparatus incorporating the novel features of the present invention is illustrated in FIGURES 1 to 3 of the drawings comprising a housing 6 detachably connected to a pressure vessel 7 to be tested. The housing 6 is adapted to contain a testing medium, such as nitrogen gas, at high pressure. In the illustrated embodiment, the housing 6 is of a two-part construction to adapt it to be opened for observation and repair and includes a lower cylindrical wall 8 and an upper cylindrical wall 9 having a screw threaded engagement. The bottom edge of the lower wall section 8 is attached to a base plate 10 as by welding and the base plate projects beyond the wall to provide a flange 11 for attachment to an adapter plate 12 by means of bolts 13. Adapter plate 12 constitutes a partition separating the pressure vessel 7 from the housing 6 and is designed for a particular vessel 7 to be tested and, in turn, is attached to the pressure vessel around an opening 14 therein by means of bolts 15.

In accordance with the present invention, a loading mechanism is provided in housing 6 for quickly subjecting the interior of pressure vessel 7 to the high pressure of the testing medium in housing 6 to produce a sudden dynamic load at the interior of the vessel and control the pressure time-rise of the load. To this end, the base plate 10 is provided with a centrally located opening 16 in which an annular sleeve element 17 is mounted. The sleeve element 17 has a radial flange 18 underlying a recessed portion of the base plate 10 around the opening 16 and detachably connected to the base plate by means of screws 19. The upper edge of sleeve 17 provides a valve seat 17a and the open interior of the sleeve provides a port opening 20 in base plate 10. Port opening 20 aligns with a port opening 21 in adapter plate 12 to provide communication between the housing 6 and interior of the pressure vessel 7 to be tested. Thus, interchangeable sleeve elements 17 having different sized port openings 20 may be used for any particular vessel 7.

An inner housing 22 is provided in the housing 6 and is in the form of a cylindrical wall surrounding the sleeve element 17 and spaced radially outwardly therefrom. The lower end of the cylindrical wall of the inner housing 22 is positioned at the peripheral edge of the opening 16 in the base plate 10 and is attached thereto as by welding. The top of the cylindrical wall of inner housing 22 is closed by a top wall 23 to form a chamber 24 and projecting upwardly from the top wall 23 is a cylindrical wall 25 of smaller diameter and the upper end is closed by a top wall 26. The lower skirt portion of the inner housing 22 has a series of openings 27 below the valve seat 17a to permit an unrestricted flow of the high pressure gas and each of the top walls 23 and 26 have restrictive openings 28 and 29, respectively.

A piston valve 30 is mounted in the cylindrical chamber 24 of the inner housing 22 so that one side overlies the valve seat 17a to close the port opening 20 and projects radially beyond the valve seat to provide an annular surface 31 subjected to the high pressure testing medium in the housing 6. Thus, the inner housing 22 provides a chamber 24 overlying piston valve 30 and the chamber is divided by wall 23 into separate compartments 33 and 34 connected in series by the restrictive opening 28 and to the housing 6 by the restrictive opening 29.

As stated above, the housing 6 contains a testing medium, such as nitrogen gas, at high pressure. The separate compartments 33 and 34 of the chamber 24 are filled with a liquid, such as water, which is subjected to the high pressure of the testing medium through the restrictive openings 28 and 29. Thus, the high pressure liquid in chamber 24 acting on the total area of the piston valve 30 holds it tightly against the valve seat 17a. The pressure vessel 7 to be tested contains a liquid, such as water, at a low pressure, for example, atmospheric pressure. The pressure vessel 7 may be only partially filled, but is usually completely filled with the liquid to the piston valve 30. To prevent leakage, a gasket 35 is provided between the valve seat 17a and piston valve 30, a gasket 36 is provided between the flange 18 of the valve seat and base plate 10 and a gasket 37 is provided between the valve seat 17 and adapter plate 12. Gasket 35 may be composed of Teflon or graphite-impregnated long-filler asbestos to maintain a high pressure seal while gaskets 36 and 37 may be made of any suitable material, such as red rubber sheet packing, or the like.

The testing medium, such as nitrogen gas, is supplied to housing 6 from a container 40 through a line 41 having a valve 42 therein, see FIGURE 1. A gauge 43 is connected to a line 41 through a valve 44 for indicating the pressure in housing 6. A liquid, such as water is supplied to the lower compartment 33 of chamber 24 through a line 45 having a valve 46 and liquid is supplied to the compartment 34 of chamber 24 through a separate line 47 having a valve 48 therein. A line 49 is connected through the base plate 10 and adapter plate 12 having a valve 50 for supplying liquid to the interior of the pressure vessel 7 to be tested.

Line 45 connecting the interior of the chamber 24 at one side of the piston valve 30 to the exterior of the housing 6 also includes an extension 51 having a solenoid operated release valve 52 and an elbow extension 53 with an orifice plate 54 mounted therein. Orifice plate 54 is detachably sealed to the end of the elbow extension 53 by a flanged nut 55 so that the orifice plate may be easily and quickly removed and another plate substituted having a different size of orifice. The solenoid winding of release valve 52 is connected in an electric circuit 56 having a source of current 57 and a control switch 58.

Measuring devices 60, such as pressure transducers are attached to the outside wall of the pressure vessel at appropriate locations, see FIGURE 1. Although not shown, it will be understood that the transducers are connected to pressure recording means. One form of the invention having now been described in detail, the mode of operation of the apparatus will now be explained.

The testing apparatus is prepared for a testing operation by selecting a particular sleeve element 17 of the proper size and attaching it to the base plate 10 by screws 19 with a gasket 36 therebetween. Base plate 10 is then attached to adapter plate 12 by bolts 13 with gasket 37 between the valve seat element 17 and adapter plate after which the entire assembly is attached to the pressure vessel 7 to be tested by means of the bolts 15. An orifice plate 54 having an orifice of the size to give the desired pressure time-rise is mounted in and attached to the elbow extension 53 of the exhaust line 51.

A liquid, such as water, is supplied through line 49 and valve 50 to fill pressure vessel 7 at a low pressure, for example, atmospheric pressure. A liquid, such as water, is then supplied through the line 45 and valve 46 and line 47 and valve 48, respectively, to fill both compartments 33 and 34 of chamber 24 and also completely fill the pressure release or exhaust line 51 to the orifice plate 54. With the apparatus so conditioned, the interior of the pressure vessel 7 is sealed from the housing 6 by the piston valve 30 engaging the valve seat 17a.

The testing medium, such as nitrogen gas is delivered from the external container 40 to the housing 6 by opening valve 42 to pressurize the interior of housing 6 and the pressure is measured by gauge 43 connected to supply line 41 through valve 44. Valve 42 in line 41 provides a means for shutting off the supply of gas to housing 6 when the desired pressure is reached. The overall pressure in housing 6 must be greater than that pressure which will be required in the pressure vessel 7 being tested when under load and taking into account the increases in the volume of system. It should be pointed out that since this increase in the volume of the system will be a function of geometry of the pressure vessel being tested, and that since the apparatus of the present invention is capable of testing many different kinds and types of pressure vessels, the volumetric displacement can not always be determined in advance so that a precise prediction of maximum dynamic loading pressure in the vessel and also of the pressure in housing 6 can not be made. However, experience with this testing apparatus has shown that the pressure in the housing 6 should be 10 percent above the maximum dynamic loading pressure desired in the pressure vessel 7.

It will be observed that the pressure of the gas in housing 6 is transmitted to the liquid in the compartments 33 and 34 through the restrictive openings 28 and 29 in the top of each compartment. The water, in turn, exerts a force on the top surface of piston 30 as indicated by arrows. This force is equal to the product of the cross-sectional area of the piston in square inches and the pressure of the testing medium in the housing 6 in pounds per square inch. It also will be observed that the testing medium in housing 6 produces an opposing force on the opposite side of the piston equal to the product area 31 of the piston extending beyond the valve seat 17a and the pressure of the medium acting on this area. In other words, a differential force acts on the piston 30 which is the pressure of the gas acting over the total area of the piston on one side and an area 31 on the other side reduced by the area of the piston overlying the valve seat 17a.

Pressure vessel 7 is tested for dynamic loading by closing switch 58, see FIGURE 2, which energizes solenoid valve 52 from the current source 57 to open the valve. When valve 52 opens, the liquid in chamber 24 at one side of the piston is suddenly released and flows through the exhaust line 51 and orifice plate 54 at a fixed rate of flow. As the liquid flows from compartment 33 as controlled by the orifice in orifice plate 54 at a faster rate than it flows into the compartment through restrictive orifice 28, the pressure on the piston valve 30 is released. Upon release of the pressure on the upper side of piston valve 30, the high pressure test medium in housing 6 acts on the area of the piston extending beyond the valve seat 17a to raise the piston valve and permit the testing medium to suddenly flow into the port opening 20.

As the piston valve 30 rises, it increases the opening between the piston valve and valve seat 17a to increase the area through which the testing medium can pass into port opening 20. When piston valve 30 reaches its maximum height, port opening 20 is fully open and thereby allows passage of the gas into the port opening at maximum capacity. Also, it will be seen that the speed at which piston valve 30 rises, due to the difference in pressure at opposite sides of the piston valve 30, is controlled by the rate of flow of the liquid through the exhaust line 51 and orifice in the orifice plate 54. The size of the orifice in orifice plate 54, therefore, is the controlling factor in the rate at which liquid flows from chamber 24 and the rate at which the piston valve 30 rises once the control valve 52 has been opened. The smaller the orifice in orifice plate 54, the longer will be the rise-time of the loading pressure. Similarly, the larger the orifice in the orifice plate 54, the more quickly will the loading pressure in the pressure vessel reach a maximum.

It will be apparent that another factor which might control the rise-time of the pressure in pressure vessel 7 is the time it takes for the solenoid valve 52 to open fully after energization. If, for example, the solenoid control valve 52 requires 10 milliseconds to move to its full open position, then the minimum pressure rise-time possible will be 10 milliseconds. If a shorter rise-time is desired, it is then necessary to employ solenoid valves which open more quickly.

Figure 4:
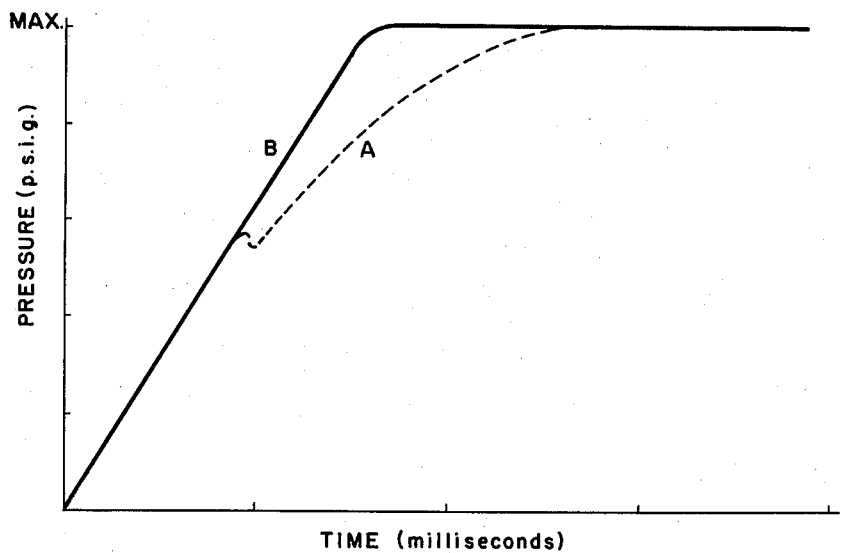
FIGURE 4 is a pressure versus time chart with graphs showing the measurements made by the testing apparatus by different modes of operation.

It has been found that the velocity of the testing medium gas as it flows into port 20 will be Mach one as long as the pressure in housing 6 is greater than 1.89 times the pressure in the vessel 7 being tested. When the pressure in the pressure vessel 7 reaches a value in excess of .53 of the pressure in housing 6, the velocity of the gas flowing into port 20 is less than Mach one. The velocity then diminishes as the pressure in vessel 7 increases and the mass rate of flow of the gases also diminishes until the pressure increase curve ends. Such a condition of operation as shown by line A in FIGURE 4 is not a straight line during the rise-time. One way of at least partially overcoming this difficulty is by increasing the area of the opening between piston valve 30 and valve seat 17a. As the pressure differential between housing 6 and interior of pressure vessel 7 decreases, the controlled movement of the piston valve 30 increases the area through which the gas flows to compensate for the decrease in velocity. Thus, the mass rate of flow of gas tends to remain constant and the pressure-time curve during rise-time approaches a straight line B exemplified in FIGURE 4.

Other ways in which the time-rise of the dynamic loading apparatus can be effected are to vary the size of port opening 20, the size of orifice 54 and the relative volume of the pressure vessel 7 to be tested and housing 6. With respect to relative volumes, for example, if the displacement of the pressure vessel 7 was 20 cubic inches then the rise-time (assuming all other things being equal) would be shorter than if the displacement were 2,000 cubic inches. The longer rise-time with greater volumetric displacement in pressure vessel 7 is due to more time being required to pass gas to fill the additional volume. Methods of compensating for such a difference in volumetric displacement between different vessels or chambers being tested would include such alternatives as partially filling the vessel being tested with a liquid, but leaving enough free volume to make up the displacement for which the dynamic loading apparatus was designed, or decreasing the area of the port opening 20.

An apparatus embodying the present invention may be used repeatedly without disassembly. The separate compartments 33 and 34 of the chamber 24 as well as the exhaust line 51 may be filled by operation of the control valve 46 which is external to the housing 6 containing the testing medium. Operation of valves 46, 48, 50 and 52 and the supply of the nitrogen gas as a testing medium through valve 42 are the only operations required between successive loading operations.

Figure 5:
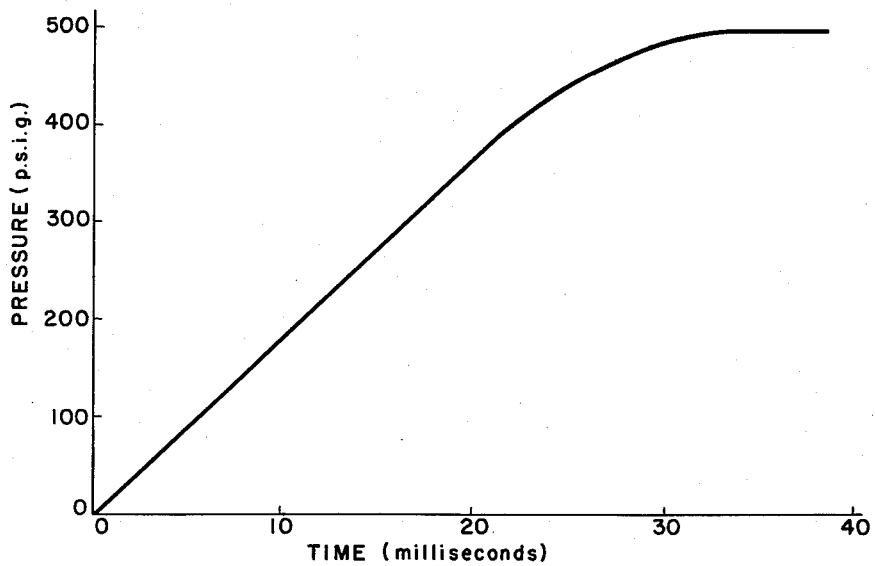
FIGURE 5 is a view similar to FIGURE 4 showing another graph of pressure versus time chart during testing of specific pressure vessel.

FIGURE 5 shows a graph plotting pressure versus time for a typical embodiment of this invention. In the apparatus used during the test the small ports 28 and 29 were 0.0625 inch in diameter, port opening 20 was 4.0 inches in diameter, and the diameter of the orifice in orifice plate 54 was 1.0 inch. The pressure vessel 7 being tested was a substantially cylindrical shell, whose wall was 1.5 inches thick, with a diameter of 6.0 feet and a length of 9.0 feet. Preliminary to loading, the compartments 33 and 34 of chamber 24 and line 51 were filled with water at line pressure, with care being taken that elbow 53 was full of water at least to a level at the top surface of line 51. Pressure of the nitrogen in housing 6 was raised to 550 p.s.i.g. Upon actuation of the solenoid valve 52 the pressure in pressure vessel 7 rose from 0 to 500 p.s.i.g. in 28 milliseconds. These pressure readings were taken by means of standard pressure transducers mounted in appropriate locations on test chamber 7, such as shown in FIGURE 1.

From the foregoing description it can be seen how readily adaptable is the apparatus of the present invention for testing pressure vessels in those fields wherein sudden high dynamic loads are encountered. It has been found, for instance, that the apparatus of this invention will more nearly duplicate the actual loading and stress behavior of a solid propellant rocket motor during ignition than any other apparatus tested. Rise-times ranging anywhere from 15 milliseconds to 300 milliseconds have been used, providing pressure increases in the test chambers in excess of 500 p.s.i.g. Both large and small test chambers have been tested with this invention, with comparable and reproducible results in all cases. Minor variations in physical form, not altering the basic principles governing the assembly, have been made as need required, but they are all well within the ability of one having skill in this particular art. It is, therefore, to be understood that changes may be made in the construction and arrangement of elements without departing from the spirit or scope of the invention. Therefore, without limitation in this respect, the invention is defined by the following claims.

We claim:
1. Testing apparatus for simulating particular dynamic loading conditions occurring during actual use in a pressure vessel having an opening therein comprising, an outer housing detachably connected to the pressure vessel around said opening and having a port opening communicating with the interior of said vessel, a piston valve overlying and extending beyond the port opening, means for applying a gas at high pressure to the outer housing to maintain a predetermined and substantially constant pressure therein, the high pressure gas acting on the area at one side of the piston valve extending beyond the port opening, an inner housing within the outer housing having an opening for transmitting the pressure from the outer housing to said area at one side of the piston extending beyond the port opening, said inner housing maintaining a pressure on the opposite side of the piston valve greater than the force applied to the extended area by the high pressure gas to close the port opening, and means for releasing the pressure in said inner housing and acting on the said opposite side of the piston valve whereby the piston valve is actuated by the high pressure gas to deliver gas from the outer housing through the opening in the inner housing to the vessel through the port opening to increase the pressure in the vessel at a rapid rate.

2. Testing apparatus for simulating dynamic loading conditions in a pressure vessel having an opening therein comprising, an outer housing detachably connected to the pressure vessel around said opening, structure in said outer housing forming a port opening between the vessel and housing and a valve seat surrounding the port opening, a piston valve having one side overlying the valve seat with an area extending beyond the valve seat subjected to the pressure in the housing, an inner housing enclosed within said outer housing and forming a chamber overlying the opposite side of the piston and having restrictive openings communicating with the outer housing, said vessel containing a liquid at low pressure, means for supplying gas to said outer housing from a high pressure source to maintain a substantially constant pressure therein and transmit gas through the restrictive openings to produce the same pressure in the chamber of the inner housing, said chamber containing liquid at the pressure in said housing, and a connection between the chamber and exterior of the outer housing including flow control means for releasing the fluid in the chamber at one side of the piston whereby the piston is actuated to increase the pressure in the vessel at a rapid rate.

3. Testing apparatus for simulating dynamic pressure loading conditions in a pressure vessel having an opening comprising, a housing detachably connected to the pressure vessel around said opening and having a partition extending across said opening with a port opening therein, a valve seat projecting from said partition around said port opening, walls in said housing dividing the housing into an inner chamber surrounding the valve seat and an outer chamber surrounding the inner chamber, a piston valve in said inner chamber adapted to engage the valve seat, said inner chamber having openings below the piston valve permitting unrestricted flow of gas and openings above the piston restricting the flow of gas, said pressure vessel containing liquid at low pressure, said outer chamber containing a gas at high pressure and said inner chamber containing liquid at the pressure in the outer chamber, and a connection from the interior of the inner chamber to the exterior of the housing having flow control means to release the fluid pressure on one side of the piston to cause the high pressure gas to move the piston valve and supply gas through the port opening to the pressure vessel.

4. Testing apparatus in accordance with claim 2 in which the flow control means comprises a valve in the connection between the chamber and exterior of the housing.

5. Testing apparatus in accordance with claim 4 in which the valve is an electro-magnetically operated valve, an electric circuit for energizing said electromagnetically operated valve, and a switch in said electric circuit.

6. Testing apparatus in accordance with claim 4 in which the connection between the chamber and exterior of the housing is an exhaust pipe, and in which the flow control means comprises an orifice in the exhaust pipe for controlling the rate of flow from the chamber and rate at which the pressure increases in the vessel being tested.

7. Testing apparatus in accordance with claim 6 in which the orifice is formed in a plate detachably mounted in the exhaust pipe whereby to adapt interchangeable plates having orifices of different sizes to be mounted in the exhaust pipe.

8. Testing apparatus in accordance with claim 2 in which the structure in said housing forming a port opening is a detachable sleeve element forming the port opening and valve seat at its upper edge whereby interchangeable sleeve elements may be used to vary the size of the port opening.

9. Testing apparatus in accordance with claim 2 in which the chamber comprises a plurality of compartments having restrictive openings therebetween to connect them in series, and a restrictive opening between the outer compartment and housing.

10. Testing apparatus in accordance with claim 2 in which separate connections are provided for supplying liquid to the vessel and chamber, respectively, and a connection is provided for supplying gas to the housing.

11. Testing apparatus in accordance with claim 2 in which the housing comprises a base plate having a central opening, a sleeve having a flange attached to the base plate around the central opening and projecting upwardly therefrom, and the chamber being mounted on the base plate in spaced relation to the valve seat and having openings in the side for delivering gas to the area of the piston projecting beyond the valve seat.

12. Testing apparatus in accordance with claim 11 in which the base plate of the housing is attached to an adapter plate for a particular pressure vessel to be tested, and said adapter plate being attached to the vessel.

References Cited in the file of this patent

UNITED STATES PATENTS

| | | |
|---|---|---|
| 1,826,088 | Ostlind | Oct. 6, 1931 |
| 1,861,684 | Dague | June 7, 1932 |
| 2,329,001 | Robinson | Sept. 7, 1943 |
| 2,357,569 | Wright et al. | Sept 5, 1944 |
| 2,895,328 | Payne et al. | July 21, 1959 |
| 2,926,882 | Russell | Mar. 1, 1960 |
| 2,949,080 | Ottestad et al. | Aug. 16, 1960 |
| 2,979,938 | Ottestad | Apr. 18, 1961 |